US012600486B2

(12) United States Patent
Lepretre et al.

(10) Patent No.: US 12,600,486 B2
(45) Date of Patent: Apr. 14, 2026

(54) METHOD AND UNIT FOR CONTROLLING A MOTOR ASSEMBLY

(71) Applicant: SAFRAN AIRCRAFT ENGINES, Paris (FR)

(72) Inventors: Jean-Baptiste Etienne Bernard Lepretre, Moissy-Cramayel (FR); Baptiste Jean-Marie Renault, Moissy-Cramayel (FR); Seif Eddine Benattia, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/846,936

(22) PCT Filed: Mar. 14, 2023

(86) PCT No.: PCT/FR2023/050342
§ 371 (c)(1),
(2) Date: Sep. 13, 2024

(87) PCT Pub. No.: WO2023/175271
PCT Pub. Date: Sep. 21, 2023

(65) Prior Publication Data
US 2025/0223048 A1      Jul. 10, 2025

(30) Foreign Application Priority Data

Mar. 15, 2022    (FR) ...................................... 2202271

(51) Int. Cl.
*B64D 31/18* (2024.01)
*B64D 27/16* (2006.01)
*B64D 27/33* (2024.01)

(52) U.S. Cl.
CPC ............. *B64D 31/18* (2024.01); *B64D 27/16* (2013.01); *B64D 27/33* (2024.01)

(58) Field of Classification Search
CPC ......... B64D 31/18; B64D 27/33; B64D 27/16
See application file for complete search history.

(56) References Cited

U.S. PATENT DOCUMENTS 5,054,285 A * 10/1991 Geidel ...................... F02K 1/72
                                                          60/228
2021/0246837 A1    8/2021 Romero et al.
2022/0063824 A1 *  3/2022 Hiett ...................... B64D 31/12

FOREIGN PATENT DOCUMENTS

CN            111175053 A *  5/2020 ........... G01M 15/02
FR            3094043 A1    9/2020

OTHER PUBLICATIONS

English Translation CN-111175053-A (Year: 2020).*

(Continued)

*Primary Examiner* — Shafiq Mian
(74) *Attorney, Agent, or Firm* — Bookoff McAndrews, PLLC

(57) ABSTRACT

A method for controlling a motor assembly. This motor assembly includes at least a first electric machine and a gas turbine engine. The gas turbine engine includes a low-pressure shaft and a high-pressure shaft. The electric machine is coupled to the low-pressure shaft, and the control method includes a step in which a take-off of mechanical work is ordered from the first electric machine to brake a rotation of the low-pressure shaft in response to an activation of a thrust reverser of the gas turbine engine and/or a disturbance of the air flow in a transverse plane at an air intake of the gas turbine engine. A control unit suitable for carrying out this method, a motor assembly incorporating this control unit, the electric machine and the gas turbine engine, and a computer program to carry out this method.

10 Claims, 2 Drawing Sheets

(56)  References Cited

OTHER PUBLICATIONS

Search Report and Written Opinion issued in International Application No. PCT/FR2023/050342, mailed Jun. 15, 2023.
Search Report issued in corresponding French Application No. 2202271, Oct. 28, 2022.

* cited by examiner

[Fig. 1]
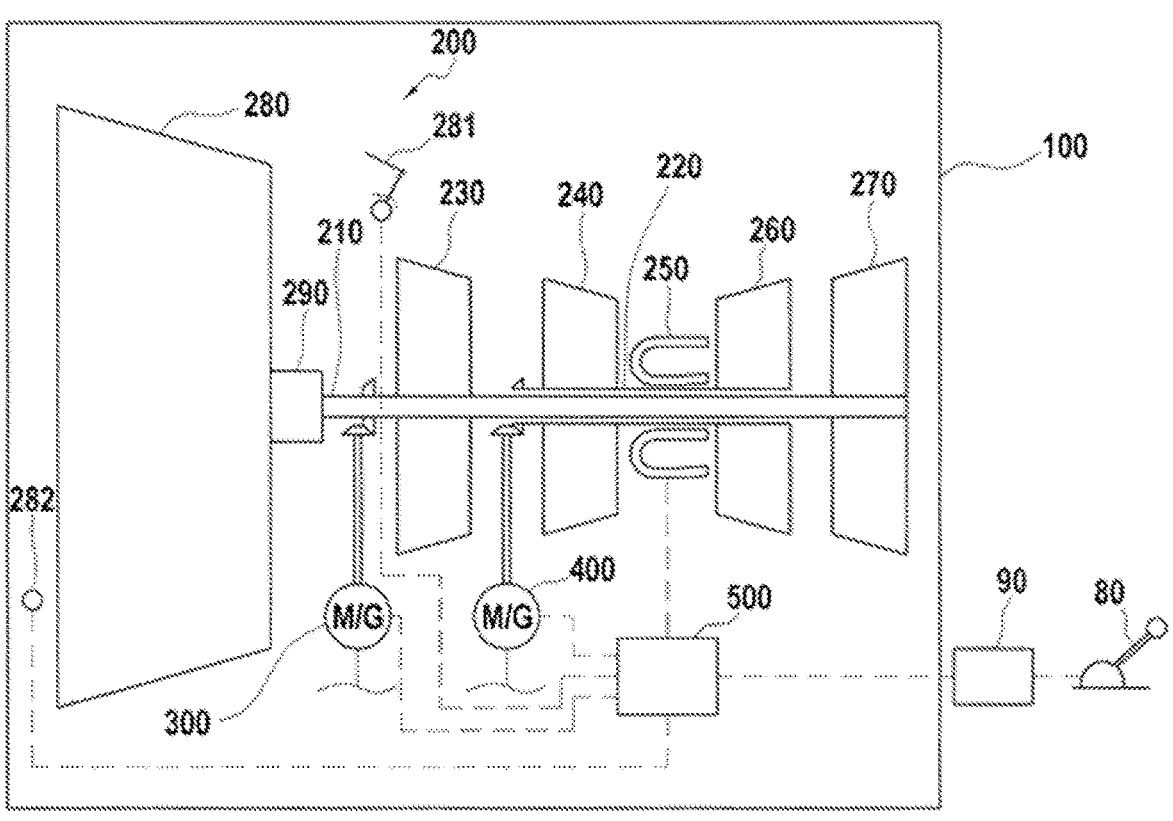

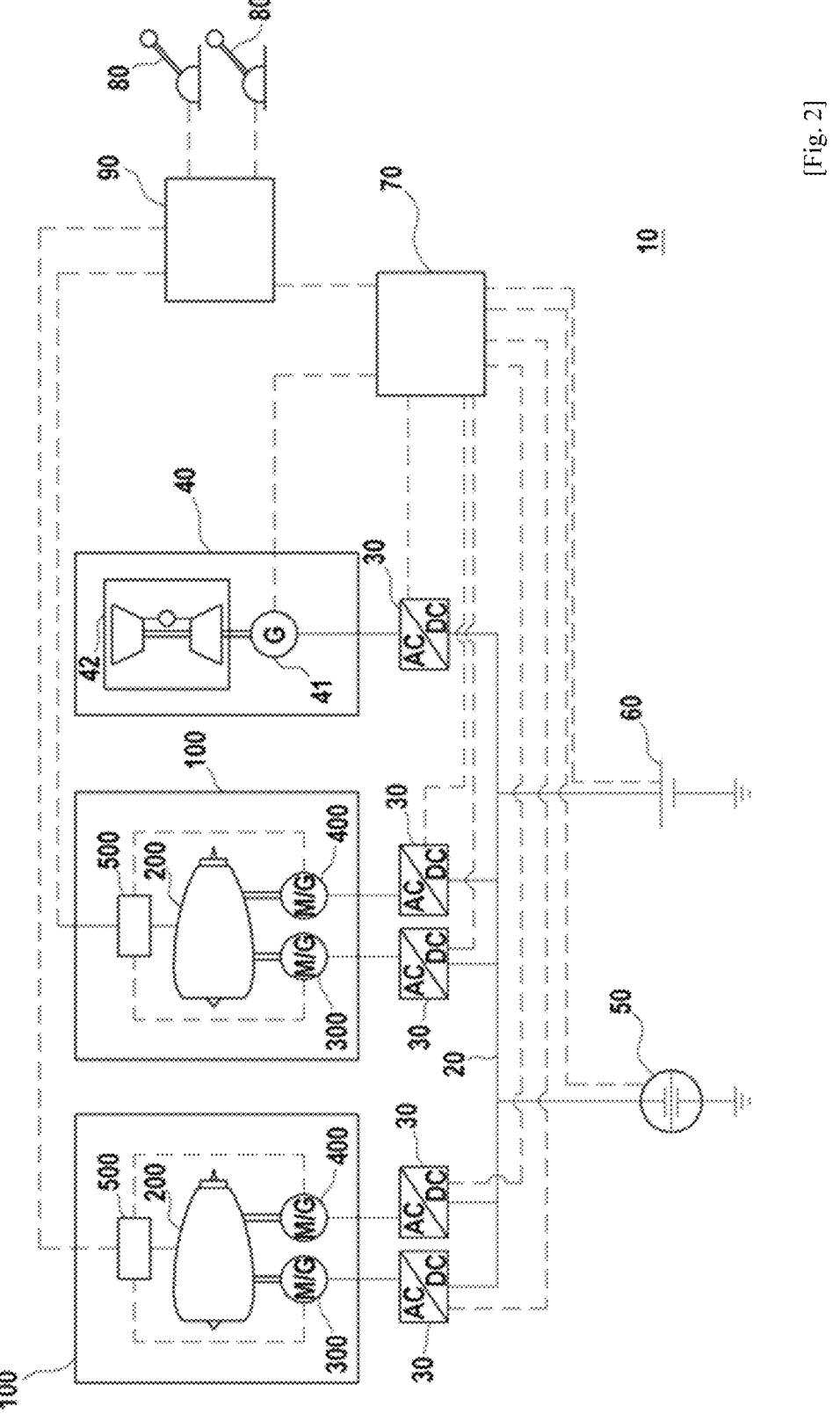
[Fig. 2]

METHOD AND UNIT FOR CONTROLLING A MOTOR ASSEMBLY

CROSS-REFERENCE TO RELATED APPLICATIONS

This is a National Stage Application under 35 U.S.C. § 371 of International Application No. PCT/FR2023/050342, filed Mar. 14, 2023, now published as WO 2023/175271 A1, which claims priority to French Patent Application No. 2202271, filed on Mar. 15, 2022.

TECHNICAL FIELD

This invention relates to the technical field of aircraft motor assemblies, and more specifically motor assemblies comprising at least one electric machine and a gas turbine engine with at least a high-pressure shaft and a low-pressure shaft.

To increase the overall energy efficiency of means of transportation, and to reduce their fuel consumption and their greenhouse gas emissions, provision has already been made for many hybrid motor assemblies combining combustion engines and electric machines contributing to the overall efficiency beyond a simple starting the internal combustion engines. Although these motor assemblies have usually been proposed for motor vehicles and had incorporated piston engines, the hybridization of gas turbine engines and more specifically gas turbine engines for aircraft has also been envisioned.

In the context of gas turbine engines, and in particular gas turbine engines for aircraft, hybridization can in fact have other advantages besides energy efficiency. Thus, in the French patent with the publication number FR 3 094 043 A1, provision has been made for using an electric machine for taking mechanical work off the low-pressure shaft of a gas turbine engine and thus for braking it, in such a way as to avoid a situation of instability of the low-pressure compressor, and in particular a risk of surge which can be exacerbated, for example, in a situation of deceleration of the gas turbine engine and/or change in the setting angle of the stator vanes. This can avoid using the opening of bleed valves at the outlet of the low-pressure compressor, and thus avoid a loss of energy efficiency. Other similar methods have been disclosed, for example in the publications of patent applications US 2022/063824 A1 and US 2021/246837 A1.

SUMMARY OF THE INVENTION

The inventors have identified other situations posing a risk of instability of the low-pressure compressor of a gas turbine engine with a high-pressure shaft and a low-pressure shaft. This disclosure therefore aims to avoid, in these other risk situations, the instability of the low-pressure compressor of such a gas turbine engine in an aircraft motor assembly comprising the gas turbine engine and at least a first electric machine to which the low-pressure shaft of the gas turbine engine is mechanically coupled, and to do so without having to open any bleed valves.

To do this, according to a first aspect of this disclosure, a method for controlling such a motor assembly may comprise a step in which a take-off of mechanical work is ordered from the first electric machine to brake a rotation of the low-pressure shaft in response to an activation of a thrust reverser of the gas turbine engine and/or to a disturbance of the air flow in a transverse plane at an air intake of the gas turbine engine.

Owing to this extraction of mechanical energy, the stability margin of the low-pressure compressor can be efficiently expanded in response to these risk situations, despite the typically high inertia of the low-pressure shaft, more quickly than with bleed valves and in a way that retrieves electrical energy which can be used or stored on board the aircraft.

Thus, the gas turbine engine may comprise a fan coupled to the low-pressure shaft to be rotationally driven by the low-pressure shaft. In this case, the fan could comprise variable-setting blades and the take-off of mechanical work by the first electric machine could be ordered jointly with a change of setting of the blades of the fan, in such a way as to also increase the work absorbed by the fan to better brake the low-pressure shaft. However, the application of this method can also be envisioned with other types of gas turbine engine having a low-pressure shaft rotationally mechanically coupled to members with high rotational inertia, such as for example a turboprop engine in which the low-pressure shaft would be rotationally mechanically coupled to at least one propulsive propeller, or a turboshaft engine in which the low-pressure shaft could be rotationally mechanically coupled in rotation to at least one lift rotor.

This method is moreover applicable to motor assemblies comprising a reduction gear connected to the low-pressure shaft for the driving of a mechanical member by the low-pressure shaft through the reduction gear, such as for example geared turbofan engines as well as most turboprop and turboshaft engines.

Said mechanical work can in particular be controlled in an open loop. Thus, in its simplest form, the take-off of a previously determined mechanical power can be ordered for a period of time, also previously determined, in order to take off the mechanical work. It can however also be envisioned for the mechanical power taken off and/or the duration of the take-off to be variable, for example as a function of the position of the thrust reverser and/or a component of the air flow in a transverse plane at the air intake.

A second aspect of this disclosure relates to a control unit of the abovementioned motor assembly which can be adapted to order from the first electric machine a take-off of mechanical work, to brake a rotation of the low-pressure shaft in response to an activation of a thrust reverser of the gas turbine engine and/or to a transverse flow at an air intake of the gas turbine engine.

A third aspect of this disclosure relates to a motor assembly comprising the control unit of the second aspect along with the electric machine and the gas turbine engine.

A fourth aspect of this disclosure relates to a computer program which may comprise instructions which, implemented by a control unit of the abovementioned motor assembly, lead the control unit to carry out the control method of the first aspect.

BRIEF DESCRIPTION OF THE DRAWINGS

The subject of this summary and its advantages will be better understood on reading the following detailed description of embodiments given by way of non-limiting example. This description references the appended pages of figures, on which:

FIG. 1 is a schematic representation of a motor assembly according to an embodiment, comprising a gas turbine engine, two electric machines and a control unit.

FIG. 2 is a representation of an electrical system of an aircraft comprising two motor assemblies such as that of FIG. 1.

DESCRIPTION OF THE EMBODIMENTS

As illustrated on FIG. 1, a hybrid motor assembly 100 according to an embodiment may comprise a gas turbine engine 200, a first electric machine 300, a second electric machine 400 and a control unit 500. The gas turbine engine 200 may comprise a low-pressure shaft 210 and a high-pressure shaft 220. The low-pressure shaft 210 and the high-pressure shaft 220 may be arranged coaxially, as illustrated. The gas turbine engine 200 may also comprise a low-pressure compressor 230, a high-pressure compressor 240, a combustion chamber 250, a high-pressure turbine 260, and a low-pressure turbine 270, successively arranged in the direction of flow in an annular flow path of the work fluid, in such a way that the air taken in upstream of the low-pressure compressor 230 is successively compressed in the low-pressure compressor 230 and in the high-pressure compressor 240, to then generate hot combustion gas in the combustion chamber 250 by combustion of a fuel injected into this combustion chamber. This combustion gas can then be successively expanded in the high-pressure turbine 260 and in the low-pressure turbine 270, in such a way as to rotationally actuate them. The high-pressure shaft 220 can be mechanically coupled to the high-pressure turbine 260 and to the high-pressure compressor 240, in such a way that the high-pressure turbine 260 can rotationally drive the high-pressure shaft 220 and the high-pressure compressor 240, while the low-pressure shaft 210 can be mechanically coupled to the low-pressure turbine 270 and to the low-pressure compressor 230, in such a way that the low-pressure turbine 270 can rotationally drive the low-pressure shaft 210 and the low-pressure compressor 230.

As in the illustrated embodiment, the gas turbine engine 200 can be a bypass turbojet engine also comprising a fan 280, which can also be mechanically coupled to the low-pressure shaft 210, in such a way that it can also be rotationally driven by the low-pressure turbine 270 through the low-pressure shaft 210. As illustrated, the gas turbine engine 200 could also comprise a reduction gear 290 interposed between the low-pressure shaft 210 and the fan 280, in such a way that the fan 280 can be driven with a lower rotation speed than the low-pressure shaft 210. However, a fan directly driven by the low-pressure shaft 210 can also be envisioned. Moreover, other architectures of the gas turbine engine 200, without fans, can also be envisioned. Thus, the gas turbine engine 200 could alternatively be a turboprop engine, with at least one propulsive propeller mechanically coupled to the low-pressure shaft 210 through the reduction gear 290, or a turboshaft engine, with at least one lift rotor mechanically coupled to the low-pressure shaft 210 through the reduction gear 290. It can also be envisioned, in particular for a turboshaft engine or a turboprop engine, for the gas turbine engine 200 to comprise only one compressor, mechanically coupled to the high-pressure shaft 210.

The gas turbine engine 200 may moreover comprise a thrust reverser 281, comprising valves and actuators to redirect in a forward direction at least a part of the air impelled by the fan 280, and one or more sensors 282 to detect a disturbance of the flow of air in a transverse plane at the air intake in the gas turbine engine 200, a disturbance which, in a gas turbine engine 200 used to propel an aircraft, can be caused a crosswind and/or by a swirl flow induced by the aircraft itself. These sensors 282 may be disposed, as illustrated, at the intake of the gas turbine engine 200, i.e. directly upstream of the fan 280, but it is also possible, as an alternative or supplement to this disposition of the sensors 282, to envision the use of sensors disposed outside the gas turbine engine 200, particularly to detect the crosswind, and/or sensors disposed inside the gas turbine engine 200 and suitable for detecting an instability resulting from a disturbance of the flow at the intake. Said sensors 282 can in particular be dynamic pressure sensors.

The first electric machine 300 can, as illustrated, be configured as a motor-generator to selectively convert electrical energy into mechanical work in motor mode and mechanical work into electrical energy in generator mode. This first electric machine 300 can be mechanically coupled to the low-pressure shaft 210 to actuate, in motor mode, the low-pressure shaft 210, and to be actuated, in generator mode, by the low-pressure shaft 210. However, it can also be envisioned, in the context of this disclosure, for it to only be configured as an electric generator, able only to convert mechanical work into electrical energy.

Similarly, the second electric machine 400 can also be, as illustrated, configured as a motor-generator to selectively convert electrical energy into mechanical work in motor mode and mechanical work into electrical energy in generator mode. This second electric machine can be mechanically coupled to the high-pressure shaft 220 to actuate, in motor mode, the high-pressure shaft 220, and to be actuated, in generator mode, by the high-pressure shaft 220. However, it can also be envisioned, in the context of this disclosure, for it to only be configured as an electric motor, able only to convert electrical energy into mechanical work.

As illustrated on FIG. 2, in an aircraft 10, which can be an aircraft 10 with one or more similar motor assemblies 100, each of the first and second electric machines 300, 400 of each motor assembly 100 can be electrically connected to an electrical system 20. This electrical system 20 can be a DC electrical system, and each of the first and second electric machines 300, 400 of each motor assembly 100 can then be electrically connected to the electrical system 20 through a corresponding converter 30. To power this electrical system, the aircraft 10 can also include a fuel cell 50, an electrical storage device 60 (which may for example comprise a battery and/or a supercapacitor) and/or an auxiliary generator set 40, which can include a generator 41 mechanically coupled to a combustion engine 42 for its actuation and be electrically connected to the electrical system 20 through another converter 30.

The control unit 500 can be an electronic control unit, optionally a Full Authority Digital Engine Control (or FADEC) control unit. It can in particular take the form of an electronic processor able to implement the instructions of a computer program to control the operation of the motor assembly 100. This control unit 500 can be connected to the gas turbine engine 200, particularly to receive data from the sensors 282 and/or to control the supply of fuel to the combustion chamber 250, the position of the valves of the thrust reverser 281 and/or the setting of the different adjustable blade sets, and also to each of the first and second electric machines 300, 400 to control the injection and/or extraction of mechanical work from the low-pressure shaft 210 and from the high-pressure shaft 220, respectively. The control unit 500 can also be connected to a manual control, such as for example a throttle 80, and/or to a flight computer 90, in order to receive an operational setpoint of the motor assembly 100, which can for example take the form of a setpoint of thrust, power or rotational speed of the low-pressure shaft 210 and/or of the high-pressure shaft 220. In the aircraft 10, the control unit 500 of each motor assembly 100 can moreover also be connected to a control unit 70 of the electrical system 20, which can be connected in turn to each converter 30, to the generator set 40, to the fuel cell 50 and/or to the electrical storage device 60, in order to maintain an equilibrium in the electrical system 20.

The control unit 500 can be suitable for implementing a method for controlling the motor assembly 100, in which, in response to the activation of the thrust reverser 281 and/or to a transverse flow detected through the sensors 282 at the air intake of the gas turbine engine 200, the take-off of a mechanical work $W_{el}$ is ordered from the first electric machine 300 to brake the rotation of the low-pressure shaft 210. The mechanical work $W_{el}$ contributed by the first electric machine 300 can be controlled in an open loop. In this case, each of the power taken off by the first electric machine 300 during this contribution and the duration of this contribution can be previously determined or variable as a function, for example, of a setpoint of position of the thrust reverser and/or of a transverse component of air flow at the intake of the gas turbine engine 200. The taken-off power can be constant for the duration of the contribution or follow a previously determined profile.

To ensure the supply of electrical power to the first electric machine 300 during the contribution while maintaining the equilibrium of the electric machine 20, the control unit 500 can control, simultaneously with the taking-off of the mechanical work $W_{el}$ by the first electric machine 300 off the low-pressure shaft 210, the injection of a corresponding electrical energy by the second electric machine 400 into the high-pressure shaft 220 and/or its storage in the electrical storage device 60.

Although this invention has been described with reference to specific embodiments, it is obvious that modifications and changes can be made to these examples without departing from the general scope of the invention as defined by the claims. In particular, individual features of the different embodiments illustrated/mentioned can be combined into additional embodiments. Consequently, the description of the drawings must be considered in an illustrative sense rather than a restrictive one.

The invention claimed is:

1. A method for controlling an aircraft motor assembly comprising at least a first electric machine and a gas turbine engine with at least a high-pressure shaft and a low-pressure shaft mechanically coupled to the first electric machine, the control method comprising a step in which a take-off of mechanical work is ordered from the first electric machine to brake a rotation of the low-pressure shaft in response to an activation of a thrust reverser of the gas turbine engine.

2. The method as claimed in claim 1, wherein the gas turbine engine is a turbojet engine comprising a fan coupled to the low-pressure shaft to be rotationally driven by the low-pressure shaft.

3. The method as claimed in claim 2, wherein the fan comprises variable-setting blades and the take-off of mechanical work by the first electric machine is ordered jointly with a change of setting of the blades of the fan.

4. The method as claimed in claim 1, further comprising a reduction gear connected to the low-pressure shaft for a driving of a mechanical member by the low-pressure shaft through the reduction gear.

5. The method as claimed in claim 1, wherein said take-off of mechanical work is controlled in an open loop.

6. The method as claimed in claim 1, comprising an additional step of consuming and/or storing an electrical energy generated by said take-off of mechanical work.

7. A control unit of an aircraft motor assembly comprising at least a first electric machine and a gas turbine engine with a high-pressure shaft and a low-pressure shaft mechanically coupled to the first electric machine, the control unit being suitable for ordering, from the first electric machine, a take-off of mechanical work to brake a rotation of the low-pressure shaft in response to an activation of a thrust reverser of the gas turbine engine.

8. An aircraft motor assembly comprising the control unit of claim 7 as well as the first electric machine and the gas turbine engine.

9. A computer program comprising instructions which, implemented by a control unit of an aircraft motor assembly comprising a first electric machine and a gas turbine engine with a high-pressure shaft and a low-pressure shaft mechanically coupled to the first electric machine, lead the control unit to carry out the control method as claimed in claim 1.

10. A method for controlling an aircraft motor assembly comprising at least a first electric machine and a gas turbine engine with at least a high-pressure shaft and a low-pressure shaft mechanically coupled to the first electric machine, the control method comprising a step in which a take-off of mechanical work is ordered from the first electric machine to brake a rotation of the low-pressure shaft in response to a disturbance of an air flow in a transverse plane at an air intake of the gas turbine engine.

\*   \*   \*   \*   \*